UNITED STATES PATENT OFFICE.

LUDWIG GLASER, OF BERLIN, GERMANY, ASSIGNOR TO GENERAL ELECTRIC COMPANY, A CORPORATION OF NEW YORK.

PROCESS OF OBTAINING NITRIC ACID FROM GAS MIXTURES CONTAINING OXIDS OF NITROGEN.

No. 921,975.     Specification of Letters Patent.     Patented May 18, 1909.

Application filed August 8, 1907. Serial No. 387,578.

*To all whom it may concern:*

Be it known that I, LUDWIG GLASER, a subject of the Grand Duke of Saxe-Coburg-Gotha, residing at Berlin, Germany, have invented certain new and useful Improvements in Processes of Obtaining Concentrated Nitric Acid from Gas Mixtures Containing Oxids of Nitrogen, of which the following is a specification.

The numerous methods which have been proposed for the oxidation of atmospheric nitrogen by means of electrical discharges, all permit the air to be enriched only by two to four percent. of nitrous oxid. The nitrous oxid content, after its spontaneous transformation into nitrogen dioxid, is brought into contact with water in absorption towers of large dimensions, and thus transformed into nitric acid. The absorption apparatus is large in size and therefore costly, and the process permits the recovery in the form of 50% nitric acid of only a small portion of the nitric oxid. Far the larger portion must first be subjected to a costly concentrating process. The present invention aims to avoid these difficulties in the following manner. The nitric oxids are absorbed in suitable apparatus of comparatively small size by means of a weak basic oxid, characterized by the fact that the nitrates and nitrites of this base are readily decomposed at high temperature into its component parts. Careful research has shown that the oxid of zinc, copper, the rare earths, and possibly the oxids of magnesium and lead, are extremely well adapted for this purpose. For example zinc oxid combines with nitric oxid according to the following reversible reaction:—

$$2ZnO + 4NO_2 = Zn(NO_3)_2 + Zn(NO_2)_2.$$

In the cold this reaction proceeds from left to right; but when the mixture of nitrates and nitrites are heated the reaction proceeds in the reverse direction with the reformation of zinc oxid and nitric oxid, the reactions being as follows:—

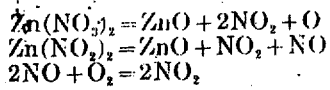

$$Zn(NO_3)_2 = ZnO + 2NO_2 + O$$
$$Zn(NO_2)_2 = ZnO + NO_2 + NO$$
$$2NO + O_2 = 2NO_2$$

The absorption of the nitric oxid is accomplished very rapidly and almost absolutely, and, provided the absorbing material is in the pulverized form and is stirred up, is accomplished to the point of the formation of neutral salts. After this stage is reached, the salts obtained are heated slowly in iron retorts up to 500°, during which they give up the absorbed nitric oxid as pure nitrous acid. This can be made, in proper water drip towers, into 40° commercial acid, or can be condensed as nitrous acid and used as such. The nitric oxid combines with water according to the reaction $$2NO_2 + H_2O = HNO_3 + HNO_2$$

Another form of embodiment of this process consists in driving off the nitric oxid in a vacuum. In this case the same rapidity of decomposition may be obtained at a much lower temperature, thereby effecting a saving in fuel.

What I claim as new and desire to secure by Letters Patent of the United States, is,—

1. The process of obtaining concentrated nitric acid from gas mixtures containing oxids of nitrogen, which includes the steps of absorbing the nitric oxid by means of a weak basic oxid, and subsequently heating to a high temperature to drive out the nitric oxid in concentrated form.

2. The process of obtaining concentrated nitric acid from gas mixtures containing oxids of nitrogen, which consists in absorbing the nitric oxid by means of a weak basic compound, subsequently heating said basic compound to liberate the absorbed nitric oxid, and absorbing said oxid in water to produce commercial acid.

3. The process of obtaining concentrated nitric acid from gas mixtures containing oxids of nitrogen, the steps which consist in absorbing the nitric oxid from the gases by means of a weak basic oxid and then decomposing the compound thus formed at less than atmospheric pressure.

4. The process which consists in passing a mixture of nitric oxid and air over a weak basic oxid, thereby forming a decomposable material, and subsequently decomposing said material by heating at less than atmospheric pressure to liberate nitric oxid.

5. The process which consists in passing a mixture of nitric oxid and air over a weak basic oxid, thereby forming a decomposable compound, and subsequently decomposing said compound to liberate said nitric oxid in concentrated form.

6. The process which consists in passing dilute nitric oxid over a basic oxid to form a decomposable compound, subsequently decomposing said compound to liberate said nitric oxid in concentrated form, and absorbing said oxid in water to form nitric acid.

In witness whereof, I have hereunto set my hand this 3rd day of July, 1907.

L. GLASER.

Witnesses:
MAX HAMBURGER,
OSKAR SINGER.